Dec. 20, 1966 W. LOHS 3,293,374

TELEPHONE SET

Filed Nov. 6, 1961

United States Patent Office 3,293,374
Patented Dec. 20, 1966

3,293,374
TELEPHONE SET

Willy Lohs, Munich, Germany, assignor to Siemens & Halske Aktiengesellschaft, Berlin and Munich, a corporation of Germany Filed Nov. 6, 1961, Ser. No. 150,418
Claims priority, application Germany, Nov. 24, 1960, S 36,119
4 Claims. (Cl. 179—100)

This invention relates to a telephone station or set comprising a housing containing a plurality of component parts or elements disposed interiorly thereof.

The object of the invention is to simplify the construction of such a telephone set insofar as the positioning and securing of these component elements are concerned.

This object is realized by inserting the individual components into and fastening them within socket-like receiving means formed interiorly of the housing of a telephone set.

In such arrangement, the component parts can be initially loosely inserted into the receiving means provided therefor. The securing thereof, within the respective receiving means, requires only little expenditure, since the corresponding component elements need be secured only against slipping from the respective receiving means, that is, securing them against displacement in one direction.

It is for this reason advantageous to employ easily releasable securing means, for example, spring controlled or resiliently operable brackets or interlock means provided on the respective component element cooperating with appropriate interlock means provided on the receiving means.

The securing of the component elements can be effected in particularly simple manner by utilizing for this purpose a housing part of the corresponding telephone set. For example, the receiving means can be provided in the cover of the housing, in the form of extensions or ribs extending interiorly therefrom, and the component elements can be secured in assigned position in the receiving means, by the clamping action of the base plate of the telephone set in cooperation with the cover to form the housing. It is advantageous to provide elastic inserts between predetermined component elements and the housing parts which effect the clamping thereof in assigned position.

It is of course understood that both expedients may be jointly used for securing or holding component elements in assigned position. It is thus possible to secure in its receiving means, a component which is subjected to mechanical stresses, such as the ringer of a telephone set, and to additionally fasten it in position by means of a resiliently operable bracket or the like which is held in place by the action of a housing part.

In the novel construction of a telephone set, the interior wiring is advantageously provided upon an insulating plate-like carrier which may be secured in place in the same manner as the remaining components. Such insulating carrier may also be provided with relatively light weight components such for example as resistors, capacitors, induction coil, and the like.

Further details and features of the invention will appear from the description of an embodiment thereof which is rendered below with reference to the accompanying drawing.

Figure 1:
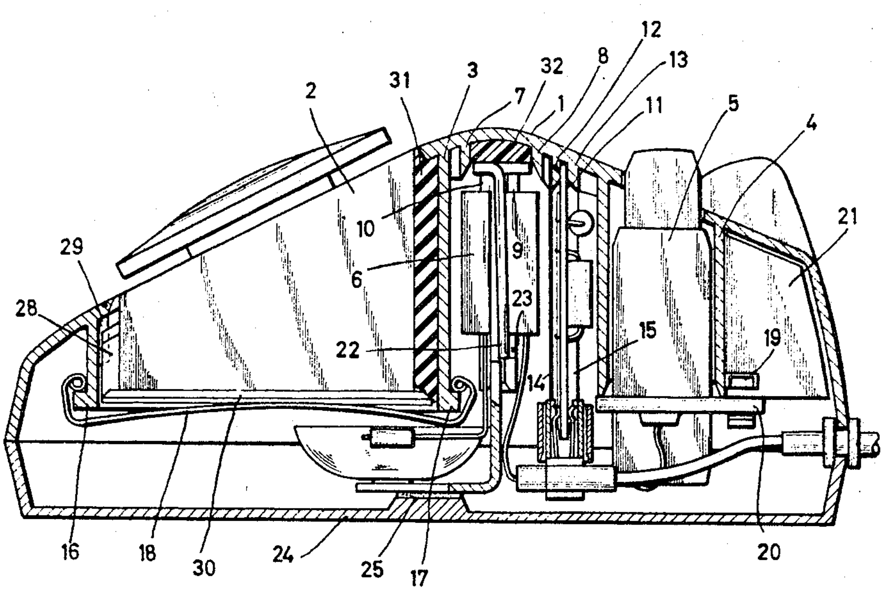
FIG. 1 shows a sectional view of the novel telephone set.

The cover 1 of the housing carries interiorly thereof a plurality of socket-like receiving means for the components of the respective telephone set or station. The dial mechanism 2 is inserted into receiving means 3, the hook switch device 5 into a receiving means 4, the ringer coil 6 into receiving means formed respectively by the ribs 7, 8 and 9, 10. The interior wiring of the telephone set is provided upon a plate 11, preferably in the form of a plane wiring such as a printed circuit such plate being inserted into receiving means similar to those for the ringer coil, formed of ribs 12, 13, 14 and 15. Ribs corresponding to those indicated at 9, 10 and 14, 15 are also provided in the opposite interior side of the cover of the housing.

The dial mechanism is held in its receiving means by a resilient bracket 18 engaging extensions 16 and 17. The switch hook device 5 is held in position by a resilient bracket 19 which underlies an extension 20 of the insulating carrier for the switch hook device and grips into a recess between ribs, one of which is visible in FIG. 1 and indicated by numeral 21. The ringer is held in its receiving means by a resilient member 22 which engages a recess 23 in the rib 9. The ringer is at the same time secured in its assigned position by the base plate 24 which engages an elastic insert 25 contacting an angular extension of the mounting means of the ringer.

Figure 2:
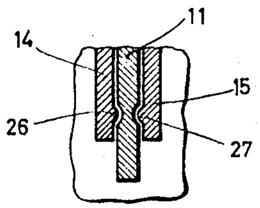
FIG. 2 represents in sectional view a detail relating to the securing of the plate carrying the interior wiring.

A detail in connection with the securing of the insulating plate 11, carrying the interior wiring, is indicated in FIG. 2. The ribs 14 and 15 are provided with beads 26, 27, such beads entering in the inserted position of the insulating plate 11 into recesses formed therein, thereby locking the plate in its assigned position.

The casing of the dial mechanism is provided with an extension 28 which is in inserted position of the mechanism disposed between ribs 29 formed in the corresponding receiving means 3, thereby securing the dial and its mechanism in proper position. Between the flange 30 of the dial casing and the housing cover 1 is arranged an elastic insert 31, such insert being disposed within the receiving means 3. An elastic insert 32 is likewise interposed between the inside wall of the cover 1 and the mounting plate for the ringer.

Component elements may be provided, as needed, with key-guide means cooperating with complementary guide means provided on the receiving means respectively assigned thereto, so as to assure proper positioning thereof within their receiving means. Suitable and known key-guide means may be used for this purpose.

Changes may be made within the scope and spirit of the appended claims which define what is believed to be new and desired to have protected by Letters Patent.

I claim:

1. A telephone set comprising a cover and a base plate forming a housing, component elements disposed interiorly of the housing, socket-like receiving means formed interiorly of the housing for receiving the respective elements, and clip means for holding predetermined ones of said component elements in assigned position within a respective receiving means provided therefor.

2. A telephone set according to claim 1, wherein said clip means includes respectively resiliently operable bracket means and interlock means carried by predetermined component elements and by the receiving means respectively provided therefor.

3. A telephone set according to claim 1, wherein predetermined component elements are provided with key-guide means cooperating with complementary guide means provided on the receiving means respectively assigned thereto, so as to assure proper positioning of the corresponding component elements within their receiving means.

4. A telephone set comprising a cover and a base plate forming a housing, component elements disposed interiorly of the housing, socket-like receiving means formed interiorly of the housing for receiving the respective component elements, and clip means for holding predetermined ones of said component elements in assigned position within the respective receiving means provided therefor, said housing including means for holding others of said component elements in assigned position within the respective receiving means provided therefor.

References Cited by the Examiner

UNITED STATES PATENTS 2,894,077 7/1959 McCoy ---------- 317—101

KATHLEEN H. CLAFFY, *Primary Examiner.*

THOMAS B. HABECKER, *Examiner.*

W. C. COOPER, *Assistant Examiner.*